Patented Mar. 11, 1952

2,589,200

UNITED STATES PATENT OFFICE 2,589,200

PROCESS FOR BREAKING EMULSIONS OF THE OIL-IN-WATER CLASS

Louis T. Monson, Puente, Calif., assignor to Petrolite Corporation, Ltd., Wilmington, Del., a corporation of Delaware No Drawing. Application August 26, 1950, Serial No. 181,699

13 Claims. (Cl. 252—344)

This invention relates to a process for resolving or separating emulsions of the oil-in-water class, by subjecting the emulsion to the action of certain chemical reagents.

Emulsions of the oil-in-water class comprise organic oily materials, which, although immiscible with water or aqueous or non-oily media, are distributed or dispersed as small drops throughout a continuous body of non-oily medium. The proportion of dispersed oily material is in many and possibly most cases a minor one.

Oil-field emulsions containing small proportions of crude petroleum oil relatively stably dispersed in water or brine are representative oil-in-water emulsions. Other oil-in-water emulsions include: steam cylinder emulsions, in which traces of lubricating oil are found dispersed in condensed steam from steam engines and steam pumps; wax-hexane-water emulsions, encountered in de-waxing operations in oil refining; butadiene tar-in-water emulsions, in the manufacture of butadiene from heavy naphtha by cracking in gas generators, and occurring particularly in the wash box waters of such systems; emulsions of "flux oil" in steam condensate produced in the catalytic dehydrogenation of butylene to produce butadiene; styrene-in-water emulsions, in synthetic rubber plants; synthetic latex-in-water emulsions, in plants producing copolymer butadiene-styrene or GRS synthetic rubber; oil-in-water emulsions occurring in the cooling water systems of gasoline absorption plants; pipe press emulsions from steam-actuated presses in clay pipe manufacture; emulsions of petroleum residues-in-diethylene glycol, in the dehydration of natural gas.

In other industries and arts, emulsions of oily materials in water or other non-oily media are encountered, for example, in sewage disposal operations, synthetic resin emulsion paint formulation, milk and mayonnaise processing, marine ballast water disposal, and furniture polish formulation. In cleaning the equipment used in processing such products, diluted oil-in-water emulsions are inadvertently, incidentally, or accidentally produced. The disposal of aqueous wastes is, in general, hampered by the presence of oil-in-water emulsions.

Essential oils comprise non-saponifiable materials like terpenes, lactones, and alcohols. They also contain saponifiable esters or mixtures of saponifiable and non-saponifiable materials. Steam distillation and other production procedures sometimes cause oil-in-water emulsions to be produced, from which the valuable essential oils are difficultly recoverable.

In all such examples, a non-aqueous or oily material is emulsified in an aqueous or non-oily material with which it is naturally immiscible. The term "oil" is used herein to cover broadly the water-immiscible materials present as dispersed particles in such systems. The non-oily phase obviously includes diethylene glycol, aqueous solutions, and other non-oily media in addition to water itself.

The foregoing examples illustrate the fact that, within the broad genus of oil-in-water emulsions, there are at least three important sub-genera. In these, the dispersed oily material is respectively non-saponifiable, saponifiable, and a mixture of non-saponifiable and saponifiable materials. Among the most important emulsions of non-saponifiable material in water are petroleum oil-in-water emulsions. Saponifiable oil-in-water emulsions have dispersed phases comprising, for example, saponifiable oils and fats and fatty acids, and other saponifiable oily or fatty esters and the organic components of such esters to the extent such components are immiscible with aqueous media. Emulsions produced from certain blended lubricating compositions containing both mineral and fatty oil ingredients are examples of the third sub-genus.

Oil-in-water emulsions contain widely different proportions of dispersed phase. Where the emulsion is a waste product resulting from the flushing with water of manufacturing areas or equipment, the oil content may be only a few parts per million. Resin emulsion paints, as produced, contain a major proportion of dispersed phase. Naturally-occurring oil-field emulsions of the oil-in-water class carry crude oil in proportions varying from a few parts per million to about 20%, or even higher in rare cases.

The present invention is concerned with the resolution of those emulsions of the oil-in-water class which contain a minor proportion of dispersed phase, ranging from 20% down to a few parts per million. Emulsions containing more than about 20% of dispersed phase are commonly of such stability as to be less responsive to the presently disclosed reagents, possibly because of the appreciable content of emulsifying agent present in such systems, whether intentionally incorporated for the purpose of stabilizing them, or not.

Although the present invention relates to emulsions containing as much as 20% dispersed oily material, many if not most of them contain appreciably less than this proportion of dispersed phase. In fact, most of the emulsions encountered in the development of this invention have contained about 1% or less of dispersed phase. It is to such oil-in-water emulsions having dispersed phase volumes of the order of 1% or less to which the present process is particularly directed. This does not mean that any sharp line of demarcation exists and that, for example, an emulsion containing 1.0% of dispersed phase will respond to the process, whereas one containing 1.1% of the same dispersed phase will remain unaffected; but that, in general, dispersed phase proportions of the order of 1% or less appear most favorable for application of the present process.

In emulsions having high proportions of dispersed phase, appreciable amounts of some emulsifying agent are probably present, to account for their stability. In the case of more dilute emulsions, containing 1% or less of dispersed phase, there may be difficulty in accounting for their stability on the basis of the presence of an emulsifying agent in the conventional sense. For example, steam condensate frequently contains very small proportions of refined petroleum lubricating oil in extremely stable dispersion; yet neither the steam condensate nor the refined hydrocarbon oil would appear to contain anything suitable to stabilize the emulsion. In such cases, emulsion stability must probably be predicated on some basis other than the presence of an emulsifying agent.

The present process, as stated above, appears to be effective in resolving emulsions containing up to about 20% of dispersed phase. It is particularly effective on emulsions containing not more than 1% of dispersed phase, which emulsions are the most important, in view of their common occurrence.

The present process is not believed to depend for its effectiveness on the application of any simple laws, because it has a high level of effectiveness when used to resolve emulsions of widely different composition, e. g., crude or refined petroleum in water or diethylene glycol, as well as emulsions of oily materials like animal or vegetable oils or synthetic oily materials in water.

Some emulsions are by-products of manufacturing procedures in which the composition of the emulsion and its ingredients is known. In many instances, however, the emulsions to be resolved are either naturally-occurring or are accidentally or unintentionally produced; or in any event they do not result from a deliberate or premeditated emulsification procedure. In numerous instances, the emulsifying agent is unknown; and as a matter of fact an emulsifying agent, in the conventional sense, may be felt to be absent. It is obviously very difficult or even impossible to recommend a resolution procedure for the treatment of such latter emulsions, on the basis of theoretical knowledge. Many of the most important applications of the present process are concerned with the resolution of emulsions which are either naturally-occurring or are accidentally, unintentionally, or unavoidably produced. Such emulsions are commonly of the most dilute type, containing about 1% or less of dispersed phase, although concentrations up to 20% are herein included, as stated above.

The process which constitutes the present invention consists in subjecting an emulsion of the oil-in-water class to the action of a reagent or demulsifier of the kind subsequently described, thereby causing the oil particles in the emulsion to coalesce sufficiently to rise to the surface of the non-oily layer (or settle to the bottom, if the oil density is greater), when the mixture is allowed to stand in the quiescent state after treatment with the reagent or demulsifier.

Reference is made to my co-pending applications Serial Nos. 181,698 and 181,700, both filed of even date, which relate to processes for the same purpose as that of the present application and which employ reagents related to the present reagents.

Applicability of the present process can be readily determined by direct trial on any emulsion, without reference to theoretical considerations. This fact facilitates its application to naturally-occurring emulsions, and to emulsions accidentally, unintentionally, or unavoidably produced; since no laboratory experimentation, to discover the nature of the emulsion components or of the emulsifying agent, is required.

The reagents employed as the demulsifiers in my process include reaction products produced by the reaction of a poly-halogenated, non-ionized organic compound and a surface-active poly-amino condensation polymer, which latter material is, in turn, obtained by the heat-polymerization of a tertiary amino-alcohol of the formula:

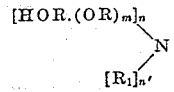

in which formula, OR is an alkylene oxide radical having not more than 4 carbon atoms and selected from the class consisting of ethylene oxide radicals, propylene oxide radicals, butylene oxide radicals, glycide radicals, and methylglycide radicals; $R_1$ is a non-aromatic radical having 6 carbon atoms or less; $m$ represent a number varying from 0 to 3; $n$ represents the numeral 1, 2, or 3; and $n'$ represents the numeral 0, 1, or 2, with the proviso that $n+n'=3$; said reaction resulting in the conversion, per molecule of poly-halogenated reactant, of at least two halogen atoms from co-valent to electro-valent state. The heat-polymerized aminoalcohol, in monomeric form, is a tertiary amine containing at least one alkanol or hydroxyalkyl radical.

Such poly-amino reactants may be obtained, for example, by the polymerization of triethanolamine, tripropenolamine, or the like, in such a manner as to eliminate water and produce ether linkages. Such polymers may, in some cases, consist of dimers; but trimers, tetramers, or more highly polymerized forms, up to octamers or higher, are useful reactants here. They are characterized by being surface-active, which means that their dilute solutions foam, reduce the surface tension of water, act as emulsifiers, etc. Their exact composition cannot in all cases be depicted by the usual chemical-formulas, because they are poly-functional, they may be acyclic or alicyclic, and they are subject to wide variations. The primary reaction is undoubtedly etherization. However, if some secondary amine, as, for example, diethanolamine or dipropanolamine, is present, water may be eliminated by some reaction other than etherization, with the result that 2 nitrogen atoms are united by an alkylene radical, as distinguished from an alkyleneoxyalkylene radical.

Even though the exact structure of the surface-active heat-polymerized alkanolamines herein employed as reactants is not fully understood, their method of manufacture is well known, and they are used commercially for various purposes. The following description is typical of the conventional polymers.

The tertiary alkanolamines having a single nitrogen atom, i. e., monoamines, may be looked upon in simplest aspect as oxyalkylated derivatives of ammonia. For example, although triethanolamine may be manufactured in various ways, it can be made by treating one mole of ammonia with 3 moles of ethylene oxide. Analogues may be prepared by using other alkylene oxides containing a reactive ethylene oxide ring, as, for example, propylene oxide, butylene oxide, glycide or methylglycide, or mixtures of these various alkylene oxides. Such products need not be derived directly from ammonia, but may be derived from primary amines containing a radical having 6 carbon atoms or less, such as methylamine, ethylamine, propylamine, butylamine, amylamine, and hexylamine. For the present purpose, I specify that any such radical present shall be nonaromatic. Aromatic radicals, if present, undesirably reduce the basic character of the amine.

If a product like triethanolamine is treated with an excess of an oxyethylating agent like ethylene oxide, one introduces the oxyethylene radical between a terminal hydrogen atom and the adjacent oxygen atom. Thus, ether-aminoalcohols obtained by reacting triethanolamine or tripropanolamine with one or two or even as many as nine moles of ethylene oxide are well known. The other similar ether-aminoalcohols are derived in the same manner and require no further description. For purposes of clarity, the tertiary amines herein included as raw materials for the polymerization step may be summarized by the following formula:

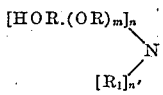

wherein OR is an alkylene oxide radical having 4 carbon atoms or less, and preferably is the ethylene oxide radical. As indicated, OR may be the propylene oxide radical, the butylene oxide radical, the glycide radical, or the methylglycide radical; $R_1$ is a non-aromatic radical having 6 carbon atoms or less; $m$ represents a numeral varying from 0 to 3; $n$ represents the numeral 1, 2, or 3; and $n'$ represents the numeral 0, 1, or 2, with the proviso that $n+n'=3$.

I prefer to use triethanolamine as my amino raw material. While the commercial product contains moderate amounts of di- and monoethanolamine, I have found it suitable.

It will be pointed out subsequently that the temperatures employed for polymerization are commonly in the neighborhood of 250° C. This means that in most instances much of any mono- or diethanolamine originally present may be volatilized and lost before having had an opportunity to react. I have found no important difference between polymers produced from chemically pure triethanolamine and those produced from commercial triethanolamine having minor percentages of mono- and diethanolamine present.

The poly-amino products obtained in the manner herein described, when manufactured in iron vessels, are viscous, deep-amber-colored to dark brown products. The degree of polymerization may be estimated approximately by the loss of water and the increase in viscosity. However, it is better to make an actual molecular weight determination in the usual manner, for example, cryoscopically. The dimers as a class show some surface-activity; if the product is heated further, with further loss of water and further increase in viscosity, the degree of polymerization and the level of surface-activity are obviously higher.

Polymerization of the basic hydroxyamines is effected by heating at elevated temperatures, generally in the neighborhood of 250° C., preferably in the presence of catalysts like sodium hydroxide, potassium hydroxide, sodium ethylate, sodium glycerate, or catalysts of the kind commonly used in the manufacture of superglycerinated fats and the like. The proportion of catalyst employed may vary from about 0.1%, in some instances, to about 1% in others. If the aminoalcohol is low-boiling, precautions must be taken not to lose the material during polymerization. At the same time, water of reaction must be permitted to be removed. At times, the process can be conducted most readily by permitting a portion of the volatile constituents to distill, and subsequently subjecting the vapors to condensation. The condensed distillate contains water formed by the reaction. After removing such water from the distillate, e. g., by distilling with xylene, and separating the xylene, the dried condensate may be returned to the reaction chamber for further processing. Sometimes, condensation is best effected in the presence of a high-boiling solvent, which is permitted to distill in such manner as to remove the water of reaction. In any event, the rate of reaction and the character of the polymerized product depend not only on the original reactants, but also on the nature and amount of catalyst, the temperature and time of reaction, and the rate of water removal from the combining mass. Polymerization can be effected in absence of catalysts, but the reaction usually takes appreciably longer, sometimes even at higher temperature.

The rate of reaction and the degree of polymerization are affected by the nature of the reaction vessel. In the examples cited below, it is intended that the reaction take place in a metal vessel such as iron. In order to obtain the same degree of polymerization in a glass vessel, the reaction time would usually have to be increased by 150–400%.

"Surface-active," as herein employed and as generally used, refers to compositions which are water-dispersible at least to the extent of producing a colloidal dispersion or sol. Thus, I do not contemplate the use of products obtained by polymerization to the extent that they are no longer dispersible or miscible in water. In the case of some of my poly-amino reactants, the degree of water-dispersibility and surface-activity is low; but conversion into the final product by reaction with the poly-halogenated reactant results in the formation of a product of desirably enhanced surface-activity.

Suitable amino raw materials, in addition to triethanolamine and tripropanolamine already mentioned, include ethyldiethanolamine, diethylethanolamine, propyldipropanolamine, dipropylpropanolamine, cyclohexyldiethanolamine, cyclohexyldipropanolamine, etc.

Other well known amines which may be employed are:

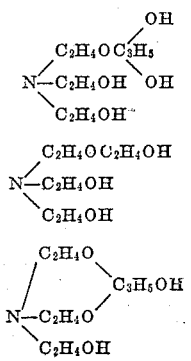

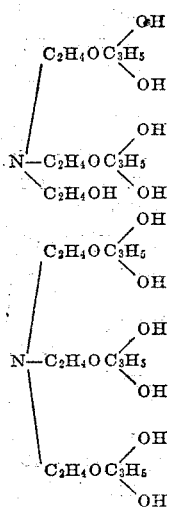

(See U. S. Patent No. 2,290,415, dated July 21, 1942, to De Groote.)

Examples of the preparation of suitable poly-amino reactants include the following:

POLY-AMINO REACTANT

*Example 1*

Add 1% of caustic soda to commercial triethanolamine and heat the mixture for 3 hours at 245–250° C., with constant stirring. Condense any distillate and reserve for re-use after an intermediate re-running dehydration step, as described above. The reaction product is largely dimeric, as shown by molecular weight determination.

POLY-AMINO REACTANT

*Example 2*

Use the procedure and reactants of Poly-Amino Reactant, Example 1, above, but continue the heating for 1.5 hours longer. The reaction mass is largely the trimer, on a statistical basis.

POLY-AMINO REACTANT

*Example 3*

Use the procedure and reactants of Poly-Amino Reactant, Examples 1 and 2, above, but continue heating until incipient rubbering at reaction temperature occurs. The product, on the average, has an average molecular weight equivalent to a mixture of tetrameric and pentameric polymers.

POLY-AMINO REACTANT

*Example 4*

Proceed as in Poly-Amino Reactant, Examples 1, 2, and 3, above, except substitute triisopropanolamine for triethanolamine. The reaction proceeds more slowly; and extension of the heating periods to at least twice those specified in those examples is required.

As stated in Poly-Amino Reactant, Example 4, above, triisopropanolamine reacts more slowly than triethanolamine in this heat-polymerization reaction. This may be due to inaccessibility of the OH groups in the branched-chain molecule. Subjection of the amine to oxyalklation, e. g., by reaction with ethylene oxide prior to heat-polymerization, will produce an etherized alkanolamine which has longer alkanol radicals, more accessible in the heat-polymerization reaction.

POLY-AMINO REACTANT

*Example 5*

React 1 mole of triisopropanolamine with 3 moles of ethylene oxide in an autoclave, using 1% of caustic soda as a catalyst and a temperature of about 150–165° C. after the pressure in the vessel returns to normal, (it will rise immediately after addition of the ethylene oxide to as much as 50 p. s. i. g.; but will fall again as the oxide reacts), raise the temperature to about 250° C. and continue heating for 5, 8 and 10 hours, respectively, to attain 3 different levels of polymerization. The vessel is left open during the 250° C. heating. This is also true for Examples 6 and 7 below.)

POLY-AMINO REACTANT

*Example 6*

Prepare a polyethanolamine of the formula:

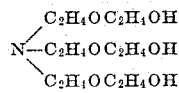

by reacting 1 mole of triethanolamine and 3 moles of ethylene oxide in an autoclave, as just described in Example 5, above. Then heat this product at about 250° C. for 3 hours, 4.5 hours, and to incipient rubbering, as described in Poly-Amino Reactant, Examples 1, 2 and 3, to attain three different levels of heat-polymerization.

POLY-AMINO REACTANT

*Example 7*

Repeat Poly-Amino Reactant, Example 6, except use 9 moles of ethylene oxide and 1 mole of triethanolamine to produce a polyethanolamine of the formula:

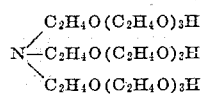

Heat this product at about 250° C. for periods of 3 hours, 4.5 hours, and to incipient rubbering, respectively, as in Poly-Amino Reactant, Examples 1, 2, and 3, to attain three different levels of heat-polymerization.

POLY-AMINO REACTANT

*Example 8*

Prepare a heat-polymerized triethanolamine by following the procedure of Poly-Amino Reactant, Examples 1, 2, or 3. Determine its hydroxyl number. Place the product in an autoclave and introduce ethylene oxide in the ratio of 1 mole for each OH group present, using a temperature of about 165° C. and 1% of caustic soda as a catalyst, as in Example 5, above.

POLY-AMINO REACTANT

*Example 9*

Repeat Poly-Amino Reactant, Example 8, but introduce, respectively, 2 and 3 moles of ethylene oxide for each OH group.

If desired, mixed alkylene oxides may be employed to produce these oxyalkylated amino materials; or such alkylene oxides may be introduced in any desired sequence instead of in admixture. It is apparent that many procedural variations are possible, all of which produce amino bodies of the specified character.

I have found the heat-polymer produced by the simple heating of commercial triethanolamine at about 250° C., with or without catalyst, to be a widely useful poly-amino reactant for producing my finished reagents. I have found that the dimer produced by heat-polymerizing triethanolamine is suitable, especially where the polyhalogenated reactant is of relatively higher molecular weight. I have found that when one approaches pentamers in the heat-polymerization of commercial triethanolamine, one has achieved a relatively high viscosity, approaching rubbering, even at polymerization temperature. My especially preferred poly-amino reactants are therefore prepared by heat-polymerizing commercial triethanolamine until the material comprises, on the average, dimers through pentamers. Where one of the radicals linked to the nitrogen atom is, for example, an alkyl radical of 5 or 6 carbon atoms, a substantial plasticizing effect may be observed, which will permit continuing heat-polymerization somewhat further before rubbering occurs. In general, I have found that when the molecular weight of the amino heat-polymer exceeds about 1,000, it often produces an inferior reaction product; and that when it exceeds 2,000, the reaction products produced from it and the polyhalogenated reactants are not particularly effective for the present purpose. I, therefore, disclaim the use of poly-amino reactants of molecular weight greater than this figure.

My reagents are produced from heat-polymerized tertiary alkanolamines of the kind just described in detail, by reacting them with a wide variety of polyhalogenated non-ionized organic reactants. As the polyhalogenated reactant, I have used, for example, the di-halogenated hydrocarbons such as ethylene dichloride, ethylene dibromide, propylene dichloride, propylene dibromide, butylene dichloride (crude dichlorobutenes), dichloropentanes (mixed dichloro derivatives of normal and isopentane), etc. I have used tri-halogenated hydrocarbon reactants, including chloroform, trichloroethane, trichloroethylene, trichloropropane, etc. Among tetrahalogenated reactants I have used are carbon tetrachloride and tetrachloroethane.

Halogenated reactants containing more than 4 halogen atoms in the molecule are likewise useful reactants for the present purpose. For example, paraffin may be chlorinated to introduce large proportions of that element. Commercially these are offered by Hooker Electrochemical Corporation, as, for example, "CP 40," "CP 50," and "CP 70," the designations being understood to mean "Chlorinated Paraffin, approximately 40% chlorine content," etc. The actual chlorine contents of such products are quite close to the percentages suggested by such designations. The product CP 40, for example, contains about 42% chlorine, equivalent to about 7.5 atoms of chlorine per molecule. CP 50 contains about 9 atoms of chlorine per molecule; and CP 70 contains about 21 atoms of chlorine per molecule. All these products are useful reactants here.

The poly-halogenated reactant need not be a halogenated hydrocarbon, however. Very good results have been obtained from products obtained from dichloromethyl ether, dichloroethyl ether, dichloroisopropyl ether, a mixture of dichloroethyl ether and dichloroisopropyl ether (available under the trade name "Betachlor" from Wyandotte Chemical Corporation), dibromoethyl ether, glycerol dichlorohydrin, triglycol dichloride, etc.

A convenient means for preparing other poly-halogenated reactants suitable for the present purpose is afforded by epichlorohydrin. By introducing at least 2 moles of this compound into each molecule of a polyhydroxylated body-like glycerol, diglycerol, ethylene glycol, polyalkylene glycols, oxyalkylated glycerol, erythritol, pentaerythritol, etc., useful poly-halogenated reactants may be prepared. The following examples illustrate this point:

POLY-HALOGENATED REACTANT

*Example 1*

Glycerol (1 mole) is mixed with 1% of stannic chloride and reacted with 3 moles of epichlorohydrin. The reaction evolves heat and should be conducted cautiously at minimum temperature. A temperature of less than 90° C. suffices. The product is a trichloro reactant suitable for the present purpose.

POLY-HALOGENATED REACTANT

*Example 2*

Glycerol (1 mole) is reacted with 3 moles of ethylene oxide in an autoclave, using 1% caustic soda as a catalyst and a temperature of about 165° C. The product is neutralized, 1% stannic chloride is added, and 3 moles of epichlorohydrin are introduced, at about 90° C., as in Poly-Halogenated Recatant, Example 1, above.

POLY-HALOGENATED REACTANT

*Example 3*

Substituted erythritrol for glycerol in Poly-Halogenated Reactant, Examples 1 and 2, just above.

Other examples could be recited, showing the use of diglycerol, ethylene glycol, polyethylene glycols, polypropylene glycols, etc., as starting materials which can be converted through the medium of epichlorohydrin into poly-halogenated reactants useful in producing my finished reagents. The foregoing examples suffice to illustrate but obviously do not exhaust the field of useful poly-halogenated reactants.

I specifically include poly-iodo and poly-fluoro compounds among my class of poly-halogenated reactants.

I exclude from my class of useful poly-halogenated reactants ionizable poly-halogenated organic compounds, such as dichloroacetic acid and trichloroacetic acid.

I likewise exclude poly-halogenated aromatic compounds wherein the halogen atoms are attached directly to the aromatic ring. Use of such reactants would result in the presence, in the finished product, of an aromatic ring directly linked to nitrogen; this I have found undesirable. Among such aromatic poly-halogenated materials specifically excluded is dichlorobenzene. Dichlorobenzoic acid is excluded, both for the reason that it has halogen attached directly to the ring and also because it is ionizable.

To prepare my finished reagents, one need only react one or more members of my class of poly-amino reactants with one or more members of my class of poly-halogenated reagents at a suitable temperature, and in suitable proportions, for a suitable time, as explained below. The temperature required in any case should be determined cautiously, as the reaction involved is usually exothermic, and the mass may react too vigorously, with production of a rubbery or even somewhat pyrolized material of little utility. For example, when dichloroethyl ether and heat-polymerized triethanolamine are reacted, a temperature of about 110° C. is required; but if the temperature exceeds about 125° C., it is usually uncontrollable, and the batch may be spoiled for the present purpose, quickly going to a rubbery stage.

The simplest way to follow the course of the reaction between my poly-amino reactants and my poly-halogenated reactants is based on the fact that, as the reaction proceeds, halogen atoms which were originally present in un-ionized or co-valent form are converted to ionic or electro-valent halogen atoms. Determination of ionic halogen is, of course, a simple analytical procedure, requiring only titration with silver nitrate.

If one starts with a di-amino reactant and a di-halogenated reactant, for example, and determines by analysis of samples taken during the course of the reaction that one-half or less of the halogen present has been converted from the co-valent or un-ionized state to the electro-valent or ionized state, one of the two halogens originally present has been reacted, but the second remains unreacted. As heating is continued, more and more of the halogen content is converted to the ionized state.

It is usually possible to convert all the halogen present, unless there is an excess of the halogenated reactant. For example, if a di-amino reactant and a di-halogenated reactant are used in molal proportions or in proportions where there is a deficiency of the halogenated material, the proportion of ionic halogen increases as the reaction is continued. Substantially complete conversion of halogen from the un-ionized to ionized state is accomplished. Where a di-amino reactant and a tri-halogenated reactant are used, obviously the last one of the three halogen atoms will not be converted; and substantially complete reaction is indicated by conversion of two-thirds of the original halogen. If, on the other hand, a tri-amino reactant and a di-halogenated reactant are used, the conversion of halogen is somewhat more readily accomplished.

In general, in preparing my reagents, I prefer to have present a molal excess of the amino reactant, and to control by analysis the degree of conversion of halogen atoms from the un-ionized or co-valent state to the ionized or electro-valent state.

While I usually employ a single poly-amino reactant and a single poly-halogenated reactant to produce my reagents, it is perfectly possible, as stated above, to employ a mixture of amino reactants and a mixture of halogenated reactants to produce them.

In many applications of reagents of this general class to the resolution of oil-in-water emulsions, I have found it important that not more than one halogen atom per molecule of poly-halogenated reactant be converted in this reaction. One possible explanation of this fact is that under such circumstances there can be no bridging or cross-linking of the amino molecules. If the amino reactant is relatively large in size, and if cross-linking occurs, the resultant molecule will be of more than double this size. If cross-linking can be avoided, by insuring that not more than one halogen atom is converted, per molecule of poly-halogenated reactant, such excessive size can consequently be avoided.

On the other hand, there are many other occasions when it is found that increasing the molecular size of the reaction product or changing its molecular configuration, or both, markedly improves the results obtained when it is used as an oil-in-water demulsifier. For example, if both the poly-amino reactant and the poly-halogenated reactant are of relatively low molecular weight, it may be desirable to secure bridging or cross-linking to build a larger and branched molecule of increased effectiveness. In order to accomplish such bridging or cross-linking, at least 2 halogen atoms of the poly-halogenated reactant must be involved in the reaction by which my reagent is prepared.

I have limited my present invention to the use of reagents including those reaction products of my poly-amino reactants and my poly-halogenated reactants in which at least two halogen atoms per poly-halogenated reactant molecule have been converted from the co-valent or un-ionized state to the electro-valent or ionized state. Included among typical examples of my present products are:

REACTION PRODUCT

Example 1

The poly-amino reactant was a heat-polymerized commercial triethanolamine, prepared by heating that material at 255° C. for 12 hours. The poly-halogenated reactant was chloroform. A mixture of 280 pounds of the heat-polymerized triethanolamine and 44.5 pounds of chloroform was heated 8 hours, the temperature averaging about 155–160° C. most of this time. A sample withdrawn after this time was titrated with silver nitrate and showed 71.7% of the chlorine had been converted to the ionic state. Since 33.3% would represent conversion of 1 chlorine per molecule of chloroform, more than two atoms per molecule had been converted, on a statistical basis, when 71.7% conversion was accomplished, as noted. The product was an effective oil-in-water demulsifier.

REACTION PRODUCT

Example 2

The poly-amino reactant of Reaction Product, Example 1, above, (280 pounds) was mixed with 57.5 pounds of carbon tetrachloride. The mixture was heated 2.5 hours, the temperature going as high as 145° C. during this period. Titration of a sample with silver nitrate showed 57.2% of the chlorine had been converted to the ionic state. This is slightly over 2 chlorine atoms per molecule of carbon tetrachloride, on the average. Heating was continued 2.3 hours, and a second sample was titrated with silver nitrate as before. It showed 70.5% conversion of chlorine to the ionic state. Heating was continued for 2.5 hours longer. By the end of the time, 80.1% of the chlorine had been converted to the ionic state. All three products were effective oil-in-water demulsifiers.

REACTION PRODUCT

Example 3

A heat-polymerized commercial triethanolamine (302 pounds), prepared as in Reaction Product, Example 1, above, was mixed with dichloroethyl ether (57.4 pounds); and the mixture was heated 4 hours at a temperature of from 120 to 132° C. At the end of this time, a sample titrated with silver nitrate showed conversion of 82.0% of the chlorine had been accomplished. Further heating for 3.2 hours at temperatures between 145° and 163° C. produced a sample, which, by titration, showed conversion of 94.8% of the chlorine had been accomplished. Both of these products were effective oil-in-water demulsifiers.

REACTION PRODUCT

Example 4

Heat-polymerized commercial triethanolamine (280 pounds), prepared as in Reaction Product, Example 1, and 65.6 pounds of triglycoldichloride were heated for 5.5 hours, the temperature being held at about 165° C. most of this time. Titration with silver nitrate showed 76.3% of the chlorine had been converted to the ionic state. This means that, in about half of the halogenated molecules, both chlorine atoms had been converted. The product was an effective oil-in-water demulsifier.

REACTION PRODUCT

Example 5

Mix 280 pounds of heat-polymerized commercial triethanolamine, prepared as in Reaction Product, Example 1, above, and 63.6 pounds of dichloroisopropyl ether. Heat for 12.5 hours, the temperature usually lying between 160 and 172° C. At the end of this time, the conversion of chlorine from non-ionic to ionic state was substantially complete, as shown by titration with silver nitrate. The product was an effective oil-in-water demulsifier.

REACTION PRODUCT

Example 6

Mix 280 pounds of heat-polymerized commercial triethanolamine, prepared as in Reaction Product, Example 1, above, and 53 pounds of the chlorinated paraffin sold by Hooker Electrochemical Company, Niagara Falls, N. Y., under the trade name "CP 40." Heat at a temperature not exceeding 200° C. until titration with silver nitrate shows one-third of the chlorine has been converted to the ionic state. (Since the product contains approximately 42.5% chlorine, equivalent to about 7.5 chlorine atoms per molecule, on the average, this degree of conversion is equivalent to the conversion of about 2.5 of the 7.5 chlorine atoms present per molecule.) The product is an effective oil-in-water demulsifier.

REACTION PRODUCT

Example 7

Use the poly-amino reactant prepared by heat-polymerizing ethyl diethanolamine at a temperature of 250° C. until determination of the hydroxyl number by the Verley-Bölsing method shows a decline of hydroxyl content to one-half the original value. React the poly-amino material so prepared, 248 pounds, and the poly-chlorinated glycerol material produced in Poly-Halogenated Reactant, Example 1, 60 pounds, at 170° C. until the degree of conversion of the chlorine is found by silver nitrate titration to be two-thirds. (The original chlorine content of the mixture can be determined, for example, by the Parr bomb method for total chlorine.) The product is an effective oil-in-water demulsifier.

REACTION PRODUCT

Example 8

Commercial triethanolamine (280 pounds) and dichloroethyl ether (53 pounds) were heated in an iron vessel with stirring, the temperature being held at about 120–125° C. for 6 hours; at about 160° C. for 1 hour; at 200° C. for another 18 hours. The granular crystalline precipitate which formed in the early stages of the reaction slowly decreased in amount as heating continued. The degree of conversion of chlorine finally achieved was approximately 75%, to the ionized state. (This means that both chlorine atoms of half the dichloroethyl ether molecules had been converted to the ionic state.) The product was an effective oil-in-water demulsifier.

The present reagents are useful because they are able to recover the oil from oil-in-water class emulsions more advantageously and at lower cost than is possible using other reagents or other processes. In some instances, they have been found to resolve emulsions which were not economically or effectively resolvable by any other known means.

My reagents may be employed in undiluted form or they may be used diluted with any suitable solvent. Water is commonly found to be a highly satisfactory solvent, because of its ready availability and negligible cost; but in some cases, non-aqueous solvents such as aromatic petroleum solvent may be found preferable. The products themselves may exhibit solubilities ranging from rather modest water-dispersibility to full and complete dispersibility in that solvent. Because of the small proportions in which my reagents are customarily employed in practising my process, apparent solubility in bulk has little significance. In the extremely low concentrations of use they undoubtedly exhibit appreciable water-solubility or water-dispersibility as well as oil-solubility or oil-dispersibility.

My reagents may be employed alone, or they may in some instances be employed to advantage admixed with other and compatible oil-in-water demulsifiers. Specifically, I have found they may be advantageously admixed with the reagents disclosed in U. S. Patents Nos. 2,159,312 and 2,159,313, both dated May 23, 1939, to Blair and to Blair and Rogers, respectively. One useful mixture of this sort incorporates the product of Reaction Product, Example 9, above, glue, and calcium chloride. Likewise, they may be used in admixture with the reagents disclosed and claimed in my above-mentioned co-pending application, Serial No. 181,698, filed of even date herewith.

My process is commonly practised simply by introducing small proportions of my reagent into an oil-in-water class emulsion, agitating to secure distribution of the reagent and incipient coalescence, and letting stand until the oil phase separates. The proportion of reagent required will vary with the character of the emulsion to be resolved. Ordinarily, proportions of reagent required are from $1/10,000$ to $1/1,000,000$ the volume of emulsion treated; but more is sometimes required.

I have found that the factors, reagent feed rate, agitation, and settling time are somewhat interrelated. For example, I have found that if sufficient agitation of proper character is employed, the settling time is shortened materially. On the other hand, if satisfactory agitation is not available, but extended settling time is, the process is equally productive of satisfactory results.

Agitation may be achieved by any available means. In many cases, it is sufficient to introduce the reagent into the emulsion and use the agitation produced as the latter flows through a conduit or pipe. In some cases, agitation and mixing are achieved by stirring together or shaking together the emulsion and reagent. In some instances, distinctly improved results are obtained by the use of air or other gaseous medium. Where the volume of gas employed is relatively small and the conditions of its introduction relatively mild, it behaves as a means of securing ordinary agitation. Where aeration is effected by introducing a gas directly under pressure or from porous plates or by means of aeration cells, the effect is often importantly improved, until it constitutes a difference in kind rather than degree. A sub-aeration type flotation cell, of the kind commonly employed in ore beneficiation operations, is an extremely useful adjunct in the application of my reagents to many emulsions. It frequently accelerates the separation of the emulsion, reduces reagent requirements, or produces an improved effluent. Sometimes all three improvements are observable.

Heat is ordinarily of little importance in resolving oil-in-water class emulsions with my reagents. Still there are some instances where heat is a useful adjunct. This is especially true where the viscosity of the continuous phase of the emulsion is appreciably higher than that of water.

In some instances, importantly improved results are obtained by adjusting the pH of the emulsion to be treated, to an experimentally determined optimum value.

The reagent feed rate also has an optimum range, which is sufficiently wide, however, to meet the tolerances required for the variances encountered daily in commercial operations. A large excess of reagent can produce distinctly unfavorable results.

The manner of practising the present invention is clear from the foregoing description. However, for completeness the following specific example is included. The oil-in-water class emulsion in question was being produced from an oil well. It contained about 1,500 parts-per-million of crude oil, on the average, and was stable for days in absence of any attempt to resolve it. My process was practised at this location by flowing the well fluids, consisting of free crude oil, oil-in-water emulsion, and natural gas, through a gas separator, then to a steel tank of 5,000-barrel capacity. In this tank, the oil-in-water emulsion fell to the bottom and was so separated from the free oil. The oil-in-water emulsion was withdrawn from the bottom of this tank, and the reagent of Reaction Product, Example 3, above, was introduced into the stream at this point. The proportion employed was about $\frac{1}{60,000}$ the volume of emulsion, on the average. The chemicalized emulsion flowed to a second tank, mixing being achieved in the pipe. In the second tank it was allowed to stand quiescent. Clear water was withdrawn from the bottom of this tank, separated oil from the top.

My reagents have likewise been successfully applied to other oil-in-water class emulsions, of which representative examples have been referred to above. Their use is, therefore, not limited to crude petroleum-in-water emulsions.

Having thus described my invention, what I claim as new and desire to secure by Letters Patent is:

1. A process for breaking emulsions composed of an oil-dispersed in a non-oily continuous phase, in which the dispersed phase is not greater than 20%, characterized by subjecting the emulsion to the action of a reagent including a reaction product produced by the reaction between a poly-halogenated non-ionized organic compound in which the halogen atoms are not attached directly to an aromatic ring and a surface-active condensation polymer of mean molecular weight not in excess of 2,000, which latter is in turn obtained by the heat-polymerization of a tertiary aminoalcohol of the formula:

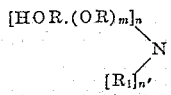

in which formula, OR is an alkylene oxide radical having not more than 4 carbon atoms and selected from the class consisting of ethylene oxide radicals, propylene oxide radicals, butylene oxide radicals, glycide radicals, and methylglycide radicals; $R_1$ is a non-aromatic hydrocarbon radical having 6 carbon atoms or less; $m$ represents a number varying from 0 to 3; $n$ represents the numeral 1, 2, or 3; and $n'$ represents the numeral 0, 1, or 2, with the proviso that $n+n'=3$; said reaction resulting in the conversion, per molecule of poly-halogenated reactant, of at least two halogen atoms from the co-valent to the electro-valent state.

2. A process for breaking oil-in-water emulsions, in which the dispersed phase is not greater than 20%, characterized by subjecting the emulsion to the action of a reagent including a reaction product produced by the reaction between a poly-halogenated non-ionized organic compound in which the halogen atoms are not attached directly to an aromatic ring and a surface-active condensation polymer of mean molecular weight not in excess of 2,000, which latter is in turn obtained by the heat-polymerization of a tertiary aminoalcohol of the formula:

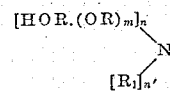

in which formula, OR is an alkylene oxide radical having not more than 4 carbon atoms and selected from the class consisting of ethylene oxide radicals, propylene oxide radicals, butylene oxide radicals, glycide radicals, and methylglycide radicals; $R_1$ is a non-aromatic hydrocarbon radical having 6 carbon atoms or less; $m$ represents a number varying from 0 to 3; $n$ represents the numeral 1, 2, or 3; and $n'$ represents the numeral 0, 1, or 2, with the proviso that $n+n'=3$; said reaction resulting in the conversion, per molecule of poly-halogenated reactant, of at least two halogen atoms from the co-valent to the electro-valent state.

3. A process for breaking oil-in-water emulsions, in which the dispersed phase is not greater than 1%, characterized by subjecting the emulsion to the action of a reagent including a reaction product produced by the reaction between a poly-halogenated non-ionized organic compound in which the halogen atoms are not attached directly to an aromatic ring and a surface-active condensation polymer of mean molecular weight not in excess of 2,000, which latter is in turn obtained by the heat-polymerization of a tertiary aminoalcohol of the formula:

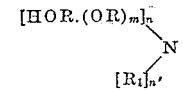

in which formula, OR is an alkylene oxide radical having not more than 4 carbon atoms and selected from the class consisting of ethylene oxide radicals, propylene oxide radicals, butylene oxide radicals, glycide radicals, and methylglycide radicals; $R_1$ is a non-aromatic hydrocarbon radical having 6 carbon atoms or less; $m$ represents a number varying from 0 to 3; $n$ represents the numeral 1, 2, or 3; and $n'$ represents the numeral 0, 1, or 2, with the proviso that $n+n'=3$; said reaction resulting in the conversion, per molecule of poly-halogenated reactant, of at least two halogen atoms from the co-valent to the electro-valent state.

4. A process for breaking petroleum oil-in-water emulsions, in which the dispersed phase is not greater than 1%, characterized by subjecting the emulsion to the action of a reagent including a reaction product produced by the reaction between a poly-halogenated non-ionized organic compound in which the halogen atoms are not attached directly to an aromatic ring and a surface-active condensation polymer of mean molecular weight not in excess of 2,000, which latter is in turn obtained by the heat-polymerization of a tertiary aminoalcohol of the formula:

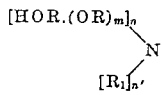

in which formula, OR is an alkylene oxide radical having not more than 4 carbon atoms and selected from the class consisting of ethylene oxide radicals, propylene oxide radicals, butylene oxide radicals, glycide radicals, and methylglycide radicals; $R_1$ is a non-aromatic hydrocarbon radical having 6 carbon atoms or less; $m$ represents a number varying from 0 to 3; $n$ represents the numeral 1, 2, or 3; and $n'$ represents the numeral 0, 1, or 2, with the proviso that $n+n'=3$; said reaction resulting in the conversion, per molecule of poly-halogenated reactant, of at least two halogen atoms from the co-valent to the electro-valent state.

5. The process of claim 4, wherein $n'$ is 0.

6. The process of claim 4, wherein both $n'$ and $m$ are 0.

7. The process of claim 4, wherein both $n'$ and $m$ are 0, and OR is the ethylene oxide radical.

8. The process of claim 4, wherein the heat-polymerized aminoalcohol reactant is a heat-polymerized triethanolamine.

9. The process of claim 4, wherein the heat-polymerized aminoalcohol reactant is a heat-polymerized commercial triethanolamine of mean molecular weight not in excess of 2,000.

10. The process of claim 4, wherein the heat-polymerized aminoalcohol reactant is a heat-polymerized commercial triethanolamine of mean molecular weight not in excess of 2,000 and the poly-halogenated non-ionized organic compound is chloroform.

11. The process of claim 4, wherein the heat-polymerized aminoalcohol reactant is a heat-polymerized commercial triethanolamine of mean molecular weight not in excess of 2,000 and the poly-halogenated non-ionized organic compound is dichloroethyl ether.

12. The process of claim 4, wherein the heat-polymerized aminoalcohol reactant is a heat-polymerized commercial triethanolamine of mean molecular weight not in excess of 2,000 and the poly-halogenated non-ionized organic compound is carbon tetrachloride.

13. The process of claim 4, wherein the heat-polymerized aminoalcohol reactant is a heat-polymerized commercial triethanolamine of mean molecular weight not in excess of 2,000 and the poly-halogenated non-ionized organic compound is chlorinated paraffin.

LOUIS T. MONSON.

REFERENCES CITED

The following references are of record in the file of this patent:

UNITED STATES PATENTS

| Number | Name | Date |
|---|---|---|
| 2,159,312 | Blair | May 23, 1939 |
| 2,159,313 | Blair et al. | May 23, 1939 |
| 2,407,895 | Monson et al. | Sept. 17, 1946 |
| 2,470,829 | Monson | May 24, 1949 |